(12) United States Patent
Kaliski, Jr. et al.

(10) Patent No.: US 10,033,535 B2
(45) Date of Patent: Jul. 24, 2018

(54) MULTIFACETED ASSERTION DIRECTORY SYSTEM

(71) Applicant: VERISIGN, INC., Reston, VA (US)

(72) Inventors: Burton S. Kaliski, Jr., McLean, VA (US); Glen Wiley, Goochland, VA (US)

(73) Assignee: VERISIGN, INC., Reston, VA (US)

( * ) Notice: Subject to any disclaimer, the term of this patent is extended or adjusted under 35 U.S.C. 154(b) by 115 days.

(21) Appl. No.: 15/071,408

(22) Filed: Mar. 16, 2016

(65) Prior Publication Data

US 2016/0277192 A1    Sep. 22, 2016

Related U.S. Application Data

(60) Provisional application No. 62/133,918, filed on Mar. 16, 2015.

(51) Int. Cl.
| | |
|---|---|
| H04L 9/32 | (2006.01) |
| H04L 29/06 | (2006.01) |
| H04L 9/30 | (2006.01) |

(52) U.S. Cl.
CPC .............. *H04L 9/3247* (2013.01); *H04L 9/30* (2013.01); *H04L 63/0815* (2013.01); *H04L 63/0823* (2013.01)

(58) Field of Classification Search
CPC ... H04L 9/30; H04L 63/0823; H04L 63/0815; H04L 9/3247
USPC ......................................................... 713/176
See application file for complete search history.

(56) References Cited

U.S. PATENT DOCUMENTS

| | | | |
|---|---|---|---|
| 8,561,161 B2* | 10/2013 | Blakley, III | ........ H04L 63/0815 709/229 |
| 8,832,836 B2 | 9/2014 | Thomas et al. | |
| 8,862,777 B2 | 10/2014 | Panidepu | |
| 8,990,557 B2* | 3/2015 | Kassaei | ................. H04L 9/3234 713/150 |
| 2004/0128541 A1 | 7/2004 | Blakley et al. | |
| 2008/0066170 A1 | 3/2008 | Dillaway et al. | |
| 2008/0184339 A1 | 7/2008 | Shewchuk et al. | |
| 2012/0174225 A1 | 7/2012 | Shyamsunder et al. | |
| 2012/0239731 A1 | 9/2012 | Shyamsunder et al. | |
| 2013/0018944 A1 | 1/2013 | Shyamsunder et al. | |
| 2014/0282887 A1 | 9/2014 | Kaminsky | |

OTHER PUBLICATIONS

Extended European Search Report Application No. 16 16 0719, dated May 11, 2016, 8 pages.

* cited by examiner

*Primary Examiner* — Baotran N To
(74) *Attorney, Agent, or Firm* — Artegis Law Group, LLP

(57) ABSTRACT

A method of providing one or more assertions about a subject is provided. The method includes obtaining, at an assertion directory access server and over a network, a first assertion about a first attribute of the subject from a first assertion issuer; obtaining, at the assertion directory access server and over a network, a second assertion about a second attribute of the subject from a second assertion issuer; and providing, from the assertion directory access server, the first assertion and the second assertion to an assertion directory authority server over a network.

23 Claims, 9 Drawing Sheets

MULTIFACETED ASSERTION DIRECTORY SYSTEM

CROSS-REFERENCE TO RELATED APPLICATIONS

This application claims priority to U.S. Provisional Patent Application No. 62/133,918 filed on Mar. 16, 2015, which is hereby incorporated by reference in its entirety.

BACKGROUND

In today's increasingly connected world, applications must make faster and more complex decisions about what data to trust and what actions to take. These decisions can take into account information from many sources, which may vary in trustworthiness. It is desirable therefore for applications to have some information, especially critical information, in a form that can be verified as more trustworthy. Digital signatures have become widely deployed for this purpose.

Many of the uses of digital signatures can be considered as a type of assertion where one party, an issuer, makes a statement about another party, a subject, for use by a relying party such as an application. For example, a web server certificate is an assertion by a certification authority that a web server is associated with a given public key. The certification authority attaches its signature to the assertion so that other parties can verify that the certification authority made the assertion. Other examples include attribute certificates, which are statements issued by an attribute authority about one or more attributes of a subject; signed records in the Domain Name Security Extensions ("DNSSEC"), which are statements issued by a zone administrator about a domain name; and authentication assertions in the Security Assertion Markup Language ("SAML").

With a signature, an assertion becomes transferable: any party can verify the authenticity of the assertion simply by applying the issuer's public key; the party does not need to interact with the issuer directly. For the same reason, a signed assertion is accountable: if the assertion's signature is valid, the issuer cannot deny that it made the assertion, but if the signature is not valid, then other parties cannot claim that the issuer made the assertion.

Despite the growing importance of assertions, there is no convenient way for a relying party to obtain the multifaceted set of assertions that it may need to perform its application logic, nor for issuers and subjects to manage this set. Current approaches are limited to certain types of information and do not necessarily provide the full confidence that applications may require. For example, a web server's certificate is readily obtained as part of process of setting up a secure connection with the server. However, it is not as straightforward to obtain an email user's certificate prior to sending a secure email to the user, or to obtain an assertion about a merchant's payment information prior to making a payment to the merchant, because connections to these parties—the subjects of the assertions—may not be available at the time the email is being sent or the payment is being made.

Furthermore, even when a relying party is able to obtain an assertion such as a certificate, it may not be clear that this is the assertion that the subject intends for the relying party to employ. This is a result of the fact that for a typical relying party, the signature on an assertion must be validated against a trust list, a set of public keys configured in the relying party's application. The signature typically must either be verifiable by a public key in the trust list, or by a public key certified through a chain of one or more certificates leading to a public key in the trust list. Because the trust list is large, there is a possibility that some of the participants in the trust hierarchy—any of which might be accepted as an assertion issuer—may be compromised. As a result, even though the actual issuer of a given assertion about a subject may not have been compromised, a different issuer might be able to produce an incorrect assertion about the subject, and absent other information, the relying party might accept it.

There have been some steps in the direction of a more convenient way for a relying party to obtain assertions that it can trust. For example, DNS-based Authentication of Named Entities (DANE) provides a way for a subject—in this case the party associated with a domain name—to publish its certificates in a standard location that is easy for a relying party to discover. Moreover, the subject—or the DNS zone administrator acting on behalf of it—can add its own signature to the record containing the certificate—a "countersignature"—to confirm, in a transferable way, that the certificate is indeed the one that the subject intends for the relying party to employ. Along with other features of DANE, this is a direct countermeasure to the problem just mentioned where a different issuer attempts to present an alternate certificate in place of the actual one. Despite these advantages, DANE as currently specified is still limited by the lack of several characteristics that may be important in new applications.

SUMMARY

According to examples of the present disclosure, a method of providing one or more assertions about a subject is provided. The method includes obtaining, at a first assertion directory access server and over a network, a first assertion about a first attribute of the subject from a first assertion provider; obtaining, at a second assertion directory access server and over a network, a second assertion about a second attribute of the subject from a second assertion provider; providing, from the first assertion directory access server and the second assertion directory access server, the first assertion and the second assertion, respectively, to an assertion directory authority server over a network; obtaining, at a third assertion directory access server and over a network, a first request for the first assertion, the second assertion, or both the first assertion and the second assertion from a relying party; providing, by the third assertion directory access server and over a network, a second request for the first assertion, the second assertion, or both the first assertion and the second assertion to the assertion directory authority server; obtaining, by the third assertion directory access server and over a network, the first assertion, the second assertion, or both the first assertion and the second assertion from the assertion directory authority server; and providing, by the third assertion directory access server and over a network, the first assertion, the second assertion, or both the first assertion and the second assertion to the relying party.

According to some examples, the first assertion or the second assertion comprises a web server certificate, a public key assertion, a privacy assertion, a reputation assertion, a payment information assertion, a factory test assertion, or a field test assertion.

According to some examples, the method can include creating a digital signature for the first assertion, the second assertion, or both the first assertion and the second assertion using a digital signature protocol and a cryptographic key associated with the first assertion directory access server or the second directory access server.

According to some examples, the method can include determining that the relying party is permitted to access the first assertion, the second assertion, or both the first assertion and the second assertion based on a policy.

According to some examples, the first assertion provider is an issuer of the first assertion that makes one or more statements contained in the first assertion and confirms the one or more statements with a digital signature.

According to some examples, the second assertion provider is an issuer of the second assertion that makes one or more statements contained in the second assertion and confirms the one or more statements with a digital signature.

According to some examples, the first assertion provider is the subject.

According to some examples, the second assertion provider is the subject.

According to some examples, the first assertion directory access server and the second assertion directory access server are the same.

According to some examples, the first assertion directory access server and the third assertion directory access server are the same.

According to examples of the present disclosure, a method of provisioning one or more assertions about a subject is provided. The method includes obtaining, at a first assertion directory authority server over a network, a request to provision a first assertion about a first attribute of the subject from a first assertion directory access service server and issued by a first assertion issuer; obtaining, at a second assertion directory authority server over a network, a request to provision a second assertion about a second attribute of the subject from a second assertion directory access service server and issued by a second assertion issuer; provisioning, by a hardware processor of the first assertion directory authority server, a first record to store the first assertion in a first partition of a database associated with the first assertion directory authority server; and provisioning, by a hardware processor of the second assertion directory authority server, a second record to store the second assertion in a second partition of a database associated with the second assertion directory authority server.

According to some examples, each assertion directory authority server manages access and associated directory entries for a respective partition.

According to some examples, the access comprises one or more of: a publication, an update, a deletion, and/or a lookup.

According to some examples, the access is based on one or more policies from one or more of: the first assertion directory authority server, the second assertion directory authority server, the first assertion issuer, the second assertion issuer, the subject, and a relying party.

According to some examples, each assertion directory authority server is operable to determine usage statistics for the partition under control of each assertion directory authority server.

According to some examples, the first record comprises information for the first assertion issuer, the subject, an attribute type, and an attribute value arranged as a tuple.

According to some examples, the first record further comprises a serial number and a validity period.

According to some examples, the first record and the second record are stored as a digital certificate, an attribute certificate, a domain name system security extension ("DNSSEC") record, a domain name system-based authentication of named entities ("DANE") record, or a security assertion markup language ("SAML") assertion.

According to some examples, the first record and the second record are digitally signed by one or more entities, wherein the one or more entities comprise a respective assertion issuer, the subject, or a respective directory authority.

According to some examples, the first assertion or the second assertion comprises a web server certificate, a public key assertion, a privacy assertion, a reputation assertion, a payment information assertion, a factory test assertion, or a field test assertion.

According to some examples, the first assertion directory authority server and the second access directory authority server are the same.

According to some examples, the first assertion directory access service server and the second assertion directory access service server are the same.

According to examples of the present disclosure, a method of providing one or more assertions about a subject is provided. The method includes obtaining, at an assertion directory access server and over a network, a first assertion about a first attribute of the subject from a first assertion provider; obtaining, at the assertion directory access server and over a network, a second assertion about a second attribute of the subject from a second assertion provider; and providing, from the assertion directory access server, the first assertion and the second assertion to an assertion directory authority server over a network.

According to examples of the present disclosure, a computer system is disclosed that comprises at least one hardware processor that is operate to execute instructions stored in a non-transitory computer-readable medium to perform one or more of the methods provided herein.

According to examples of the present disclosure, a non-transitory computer-readable medium is disclosed that can store instructions to perform one or more of the methods provided herein by at least one hardware processor.

BRIEF DESCRIPTION OF THE FIGURES

The drawings are not necessarily to scale. Instead, emphasis is generally placed upon illustrating the principles of the disclosures described herein. The accompanying drawings, which are incorporated in and constitute a part of this specification, illustrate several embodiments consistent with the disclosures and together with the description, serve to explain the principles of the disclosures. In the drawings.

DETAILED DESCRIPTION

Figure 1:
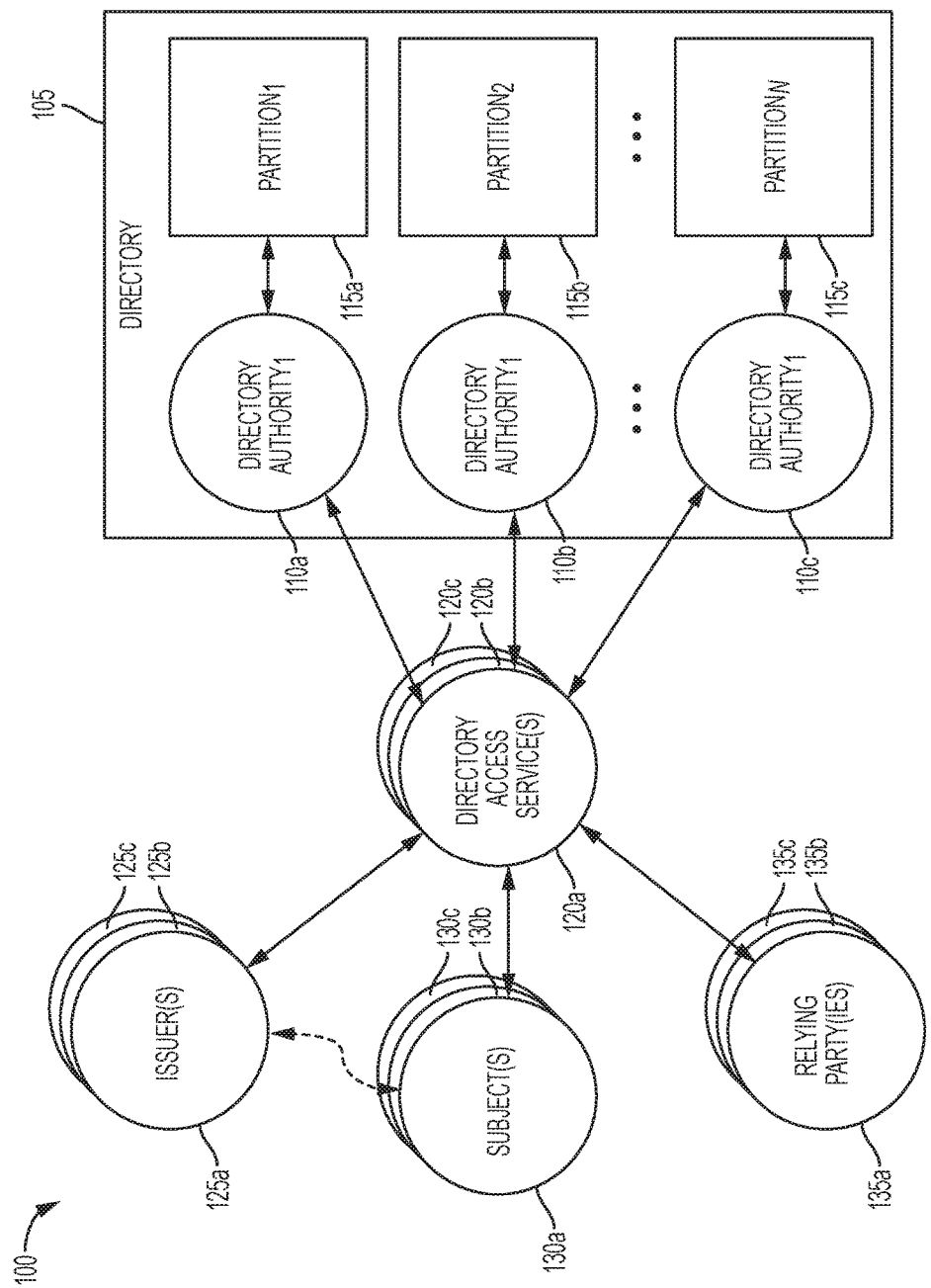
FIG. 1 shows an example multifaceted assertion directory system, according to examples of the disclosure.

The following detailed description refers to the accompanying drawings. Wherever possible, the same reference numbers are used in the drawings and the following description to refer to the same or similar parts. Also, similarly-named elements perform similar functions and are similarly designed, unless specified otherwise. Numerous details are set forth to provide an understanding of the embodiments described herein. The embodiments may be practiced without these details. In other instances, well-known methods, procedures, and components have not been described in detail to avoid obscuring the embodiments described. While several exemplary embodiments and features are described herein, modifications, adaptations, and other implementations are possible, without departing from the spirit and scope of the disclosure. Accordingly, the following detailed description does not limit the disclosure. Instead, the proper scope of the disclosure is defined by the appended claims.

Generally speaking, a relying party may be interested in one or more assertions about one or more "facets" or attributes of a subject as part of the application logic by which it decides whether and how to perform an operation. In the case of a web server certificate, the relying party—such as a web browser—may decide how to secure a connection to a web server, and whether to trust the web server, based on the success or failure of a security connection involving the web server's certificate. However, additional assertions may help the relying party make a better decision. For example, privacy is an increasingly important consideration for many users. In the case of a web server connection, the relying party may also want an assertion issued by a privacy authority that summarizes the web server's "privacy score". Although the certification authority itself could embed such a score into its certificate, or choose only to issue a certificate if a minimum score were met, the relying party may prefer to obtain the assurance directly from a privacy authority that specializes in this service.

Similarly, if the web server hosts an e-commerce site, the relying party may also want a "reputation score" that provides insight into the site's commercial practices. Although such a score again could be embedded or vetted by the certification authority, the specialization may offer more flexibility to the relying party, especially as more attribute types become available.

The unbundling of assertion services like privacy scores and reputation scores from conventional certificates can open up a new market for these specialized services. Such a market can also be important in cases where certificates are not involved. For example, online payments can be made over both established and emerging payment networks by authorizing a transfer of funds to a payee, often represented simply by an account number. Although the payment network may have a certificate that can be employed to secure the relying party's connection to the network, the payee itself may not have one. Nevertheless, the relying party, in this case in the role of a payer, may be interested both in whether the particular payee (not just the network) can be trusted to keep the payment and other payer information private—a privacy score—as well as whether the payee can be trusted to deliver on its contractual obligations, i.e., to deliver the goods or services that have been paid for—another case where a reputation score would be beneficial.

For these kinds of payments, the payer may want an assertion that relates the payee's account number or payment information to the payee's domain name, email address, or social media identifier, such as through a payment association record ("PMTA") that provides a secure and reliable association between service identifiers and payment information via a new DNS resource record ("RR") type: PMTA. Such a "related name" assertion again would not involve a public key and hence not a conventional certificate. Thus, it would be convenient for a relying party to be able to obtain a privacy assertion, a reputation assertion, a related name assertion, or some other type of assertion about a payee, without there necessarily being a certificate involved.

As another example, the "supply chain" around a device may involve a number of steps where a specialized assertion is appropriate and a certificate is not necessarily involved. For example, a relying party may be interested in a "factory test" assertion that confirms that a device has passed one round of testing, and a "field test" assertion that confirms that the device has passed another. These assertions need only be statements, made by an appropriate issuer, that the device—identified perhaps just by a serial number—has passed the test. They may be important in application logic as a more reliable form of information about the status of the device. However, even though the device may have a certificate for other purposes, these assertions do not have to be bundled within the certificate itself (which may simply state that the device has a given public key—not that it actually works). The unbundling again provides an opportunity for other issuers to provide reliable information on a rich set of attribute types.

Relying parties can interact with other parties based on assertions about those parties (including certificates). These assertions can span a number of types or "facets" of information about other parties, which may vary from one application to another and across different markets and environments. Relying parties can access a variety of these "multifaceted" assertions. However, given the proliferation of such assertions, relying parties may also want assurance that a given assertion about a subject is indeed the appropriate one—it may not be secure enough just to use any assertion that becomes available to it. Issuers and subjects may likewise want the ability to manage the set of assertions that are made available to relying parties, and to gain insight into what relying parties are looking for.

FIG. 1 shows an example multifaceted assertion directory system 100, according to examples of the present disclosure. Multifaceted assertion directory system 100 comprises directory 105, which stores of all the directory entries. Directory 105 may be implemented as an electronic server communicatively coupled to electronic persistent memory configured to store information, including but are not limited to, records for assertions issued by assertion issuers. Logically, it may be considered as a database whose records are the directory entries. However, the implementation may vary—e.g., it may involve files or other data structures, and there may be multiple copies for redundancy. Directory 105 may be partitioned into subspaces 115*a*, 115*b*, 115*c* according to, but are not limited to, subject, attribute type, and/or other criteria. A different directory authority 110*a*, 110*b*, 110*c* may manage each subspace. The partitioning of directory 105 may be expressed with special assertions (e.g., an assertion by a primary directory authority, stored at a well-known location, that indicates which authority is authoritative for which subspace and how to interface with it).

Directory authority 110*a*, 110*b*, 110*c* manages access (i.e., publication, update, deletion and/or lookup) for its partition, and manages the associated directory entries. Directory authority 110*a*, 110*b*, 110*c* may negotiate policies with issuers, subjects and relying parties regarding this access. It may also gather usage statistics to be shared with issuers and subjects. Directory authority 110*a*, 110*b*, 110*c* may also add its own signature to directory entries to indicate its concurrence. In some cases, the directory entry may be the only signer, in effect serving as the issuer.

Directory access service 120*a*, 120*b*, 120*c* interfaces between issuers 125*a*, 125*b*, 125*c*, subjects 130*a*, 130*b*, 130*c*, and relying parties 135*a*, 135*b*, 135*c* on the one hand and directory authorities 110*a*, 110*b*, 110*c* on the other to enable publication, update, deletion and/or lookup of directory entries, each according to policies agreed with the directory authorities. For example, directory access service 120*a* may be configured to provide publication services, directory access service 120*b* may be configured to provide update and deletion services, and directory access service 120*c* may be configured to provide lookup services. Each service provided by the directory access service can be provided by different servers or the same server. Although issuers 125*a*, 125*b*, 125*c*, subjects 130*a*, 130*b*, 130*c*, and relying parties 135*a*, 135*b*, 135*c* may also be able to interface with individual directory authorities directly (which may be more efficient in some cases), directory access service 120*a*, 120*b*, 120*c* provides a common interface for all directory authorities and thus for the full directory, simplifying interaction. The directory access service can also aggregate the usage statistics from directory authorities 110*a*, 110*b*, 110*c* and provide overall summary statistics to issuers and subjects.

In some examples, there can be more than one directory access service, wherein each can offer a different range of capabilities of interest to its users. Some may support only lookup operations; others may support only publication, update and deletion operations. Some may be optimized for issuers, others for subjects, and others for relying parties. They may also support different sets of attribute types (although the open architecture would facilitate introduction of new attribute types, the level of service provider support for new types may vary over time). They may support different methods for authenticating access, different APIs and different client devices. In addition, the directory access services' policies may vary according to the needs of their users.

Issuer 125*a*, 125*b*, 125*c* would make statements (e.g., assertions) of one or more attribute types about subjects. These statements would be in the form of an assertion, carrying the signature of the issuer. The issuer's public signature verification key can be managed according to established public-key infrastructure methods, or managed via assertions through the directory, or some combination of the two. An issuer could publish, update, delete and look up directory entries through a directory access service, according to agreed policies.

Subject 130*a*, 130*b*, 130*c*, as also previously described, can have statements of one or more attribute types made about it by issuers. In addition to the issuer's signature, the subject could also add its own signature, indicating its concurrence. The subject can also sign an assertion that indicates that it disagrees with a particular assertion by the issuer (or with the issuer in general), or that otherwise qualifies an issuer's statement. A relying party would then have additional evidence on which to base its decisions. Similar methods could be employed to manage the subject's signature verification key as for the issuer's public key. Subject 130*a*, 130*b*, 130*c* could also publish, update, delete and look up directory entries through a directory access service, again according to agreed policies.

The support for both issuer and subject access to the directory in the example system provides flexibility in terms of how assertions are managed. For example, a subject could take responsibility for all interactions, in which case the subject would obtain an assertion from the issuer and provide it to the directory access service; the issuer would not need to interact with the service at all. Alternatively, an issuer could take responsibility, in which case the issuer would provide the assertion to the directory access service. Subject 130*a*, 130*b*, 130*c* could also add its signature in either case.

Relying party 135*a*, 135*b*, 135*c* may look up assertions from the directory through a directory access service. The relying party may then verify each signature on the assertion with the relevant public keys, which may be managed in any of the ways already described. Alternatively, the directory access service may verify signatures on behalf of the relying party. The relying party's application logic may drive the pattern of lookup requests and subsequent actions, according to which assertions are needed to decide how to conduct some transaction involving a subject. Some examples of this logic are given below. Relying party 135*a*, 135*b*, 135*c*, by its role, can be limited to looking up assertions. However, it may also function in the role of an issuer or subject in the system.

Unlike the current DANE-based approach, new attribute types can be introduced without any changes to protocols, and issuers, subjects and relying parties can all interact with the full directory in a common and flexible way. This is a result of both the architecture of the system, and the directory access services provided. Unlike current attribute certificate repository and conventional directory approaches, issuer, subject and directory authority signatures are all direct capabilities of the system.

Multifaceted assertion directory system 100 can be implemented in part using current underlying technologies such as DANE. For example, the DNSSEC trust hierarchy may be valuable as a way to validate the subject and/or directory authority's signatures; the various DNSSEC and DANE records could be considered among the "built-in" assertions in the directory. Also similar to DANE, the directory could include assertions that express constraints on the certificates that are acceptable in a given context, i.e., the subject (or directory authority) could sign a list of acceptable certificates, public keys, certificate hashes, CA certificates, and so on, as in TLSA for Transport Layer Security (TLS) connections.

Figure 2:
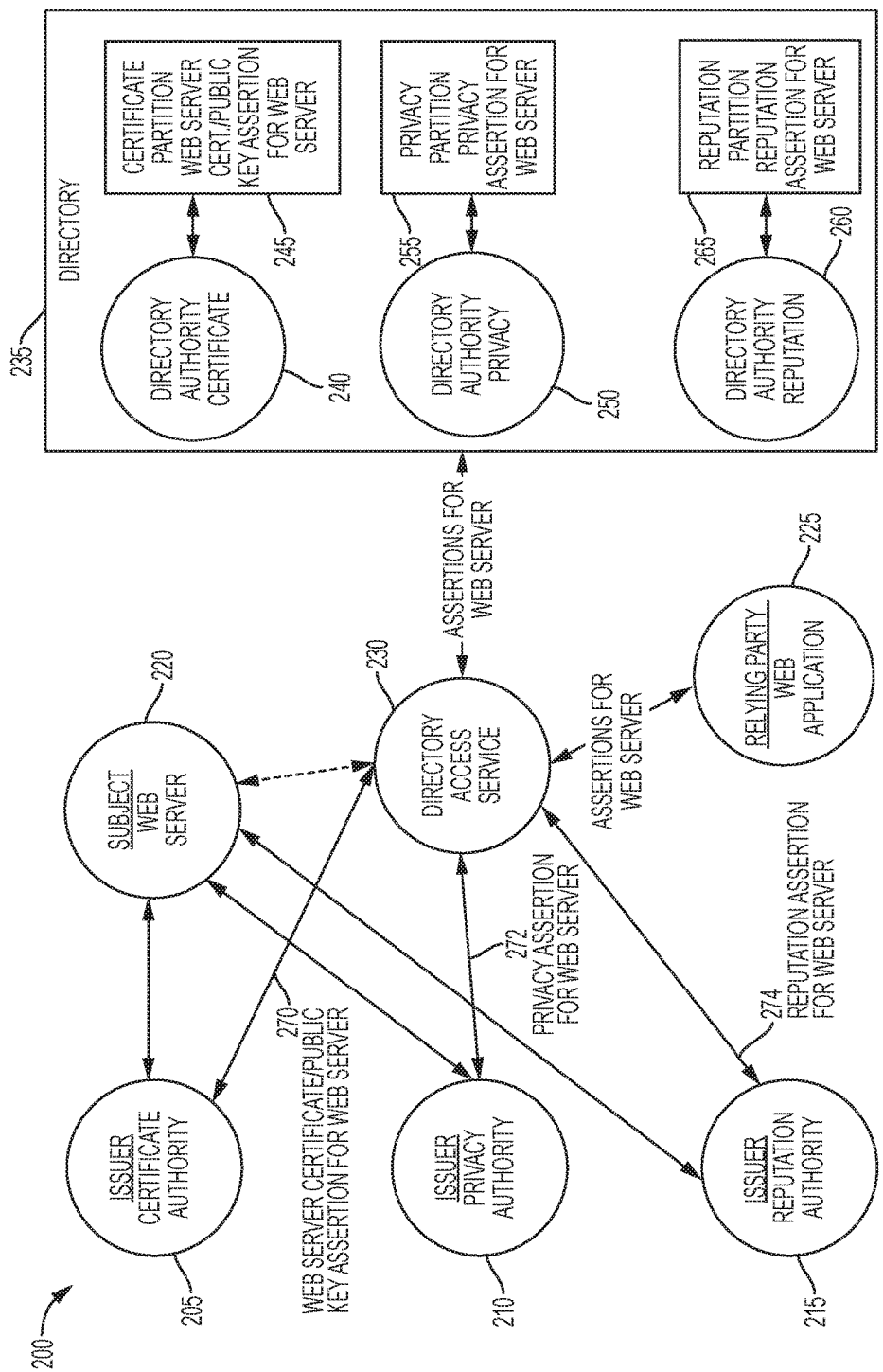
FIG. 2 illustrates a first example that involves public keys, privacy and reputation for web transactions, according to examples of the disclosure.
Figure 3:
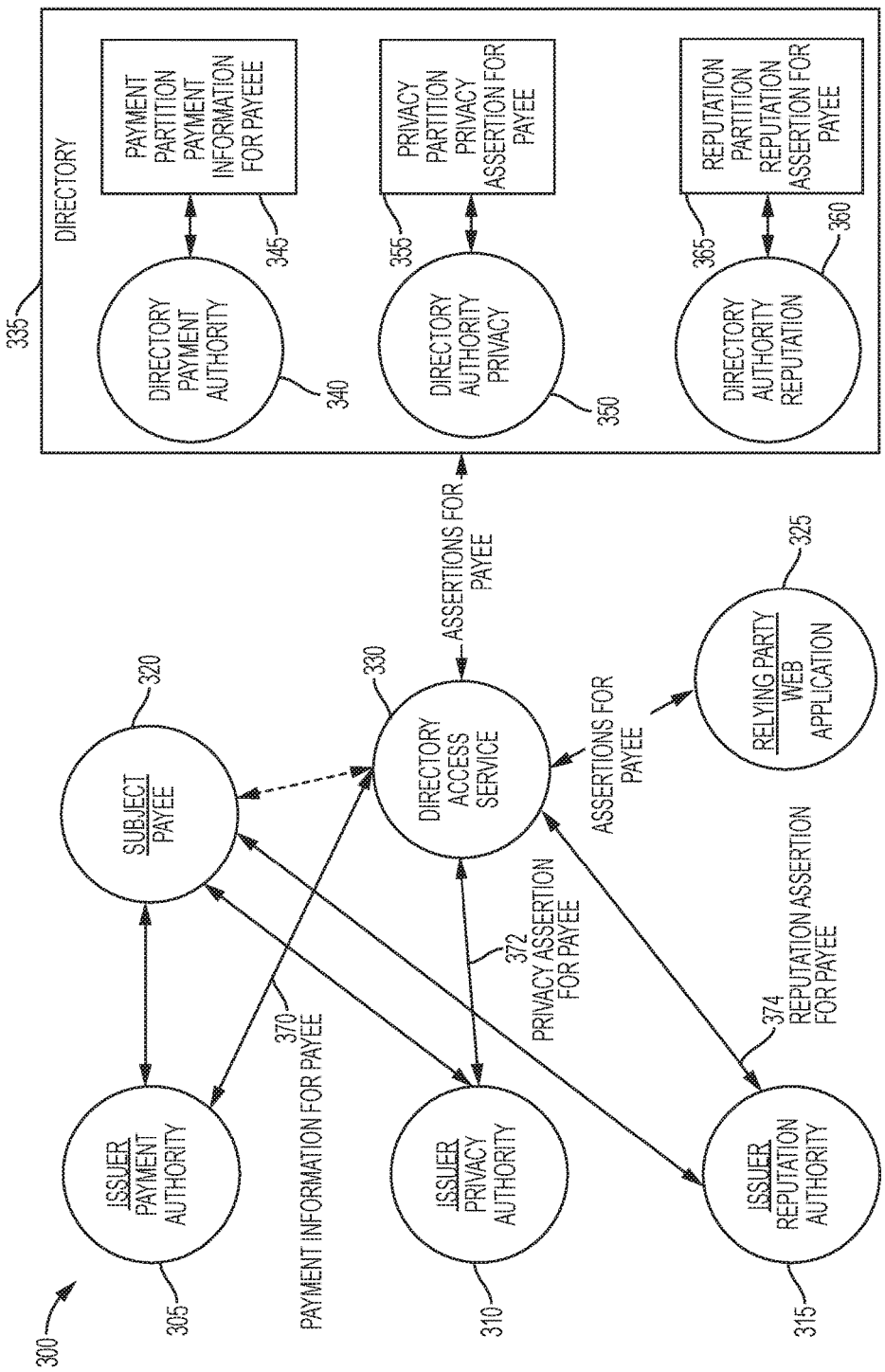
FIG. 3 illustrates a second example that involves payment information, privacy and reputation for payments, according to examples of the disclosure.
Figure 4:
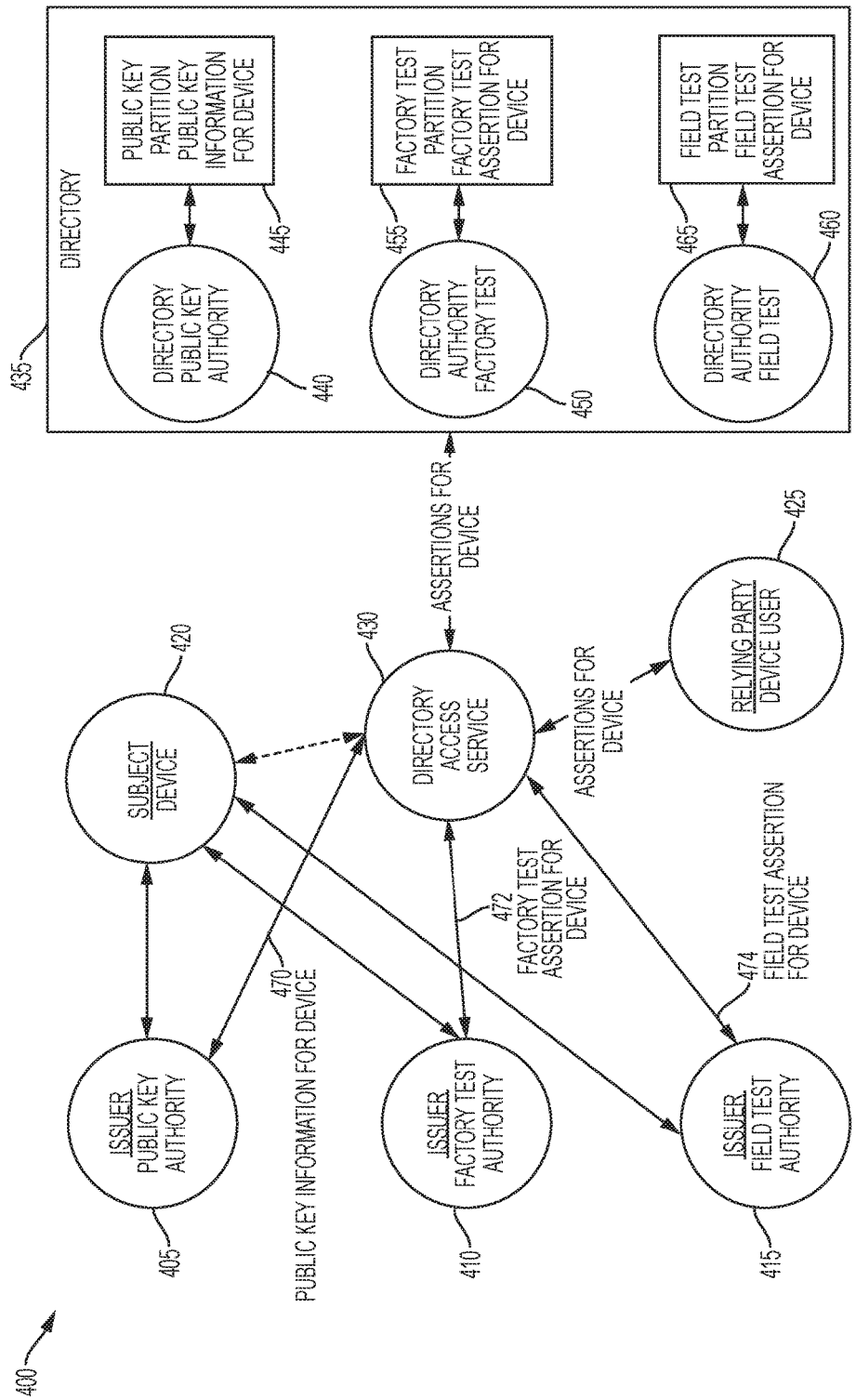
FIG. 4 illustrates a third example that involves device supply chains, according to examples of the disclosure.

FIGS. 2-4 illustrate three examples of the use of multifaceted assertion directory systems 200, 300, 400, according to examples of the present disclosure. FIG. 2 illustrates a first example 200 that involves assertions for public keys, privacy and reputation for web transactions, according to examples of the disclosure. A relying party's (web application 225) application logic may call for three (or more) assertions 270, 272, 274, when interacting with web server 220 including web server certificate or public key assertion 270, privacy assertion 272, and reputation assertion 274. Each assertion could be provided by a different issuer: certification authority ("CA") 205, privacy authority 210, and reputation authority 215.

The various issuers, certification authority ("CA") 205, privacy authority 210, and reputation authority 215 would create the assertions 270, 272, 274, respectively, after interacting with and/or evaluating web server 220 (and its associated business), the subject of the assertions. The issuers 205, 210, 215 could then publish the assertions 270, 272, 274 in directory 235 via directory access service 230, which could be the same or different for the three issuers. Alternatively, one or more of the issuers 205, 210, 215 could rely on the subject (web server 220) to publish the assertion 270, 272, 274. The subject (web server 220) and/or a directory authority, such as the authority of directory 235, could add its own signature to one or more of assertions 270, 272, 274. The directory authority might be the only signer in some use cases, e.g., when web server 220 publishes just its public key. Directory 235 can be partitioned, for example, by subject, issuer, or other factors, that can be managed by corresponding directory authorities. In the example of FIG. 2, directory 235 is partitioned into sub-directories by issuer: certificate 245 managed by certification authority directory 240; privacy 255 managed by privacy authority directory 250; and reputation 265 managed by reputation authority directory 250.

Although it may be convenient for the purpose of discovery for one or more of assertions 270, 272, 274 to be published in directory 235, it is not necessary if the relying party (web application 225) has another means of obtaining it. Instead, the subject (web server 220) can publish an assertion stating that the relying party (web application 225) should trust any assertion made by a particular issuer about the subject on for a given attribute type. For example, the subject could specify its association with a particular CA for certificates, a particular privacy authority for privacy scores, and/or a particular reputation authority for reputation scores.

For convenience, these different alternatives can also be combined into a single assertion within directory 235, i.e., one that states that a subject trusts either a particular assertion or a particular issuer (or has some other constraints on what is acceptable for a given attribute type).

A relying party (web application 225), in its application logic, can look up the assertions it needs based on subject and attribute type. The logic could be simple or complex, depending on which combinations of assertions are sufficient to meet the relying party's requirements. For example, if the subject's reputation score were 4 out of 5 (making up a scale), the relying party might require at least two assertions that show that the subject's privacy score is 5 out of 5, whereas if the subject's reputation score were 5 out of 5, just one high privacy score assertion might suffice. As another example, if the relying party is an application acting on behalf of a user, the relying party might limit the set of user information that it shares with the web server if the privacy score is below a threshold.

The attractiveness of this model to issuers should be clear. If an issuer sees a growing demand for privacy scores (for example, from its access to summary statistics), it could decide to enter the market for privacy assertions. It could then specialize in these assertions—it would not need to deliver certificates or other types of assertion. The subject could indicate with its next update to the directory that it accepts this issuer or one of this issuer's assertions and relying parties would then be able to determine the subject's privacy score. But note that there is still a check-and-balance in the system, because of the intermediation of the directory. If the directory authority does not accept the issuer as reliable for a particular attribute type, it can choose not to add its signature. If the relying party's application logic calls for the directory authority's signature as well as the others, it can then decide that this particular issuer's assertion is not acceptable. The relying party can also make its own additional decisions if needed to further constrain what it accepts. The directory authority could also signify its disapproval by not publishing the assertion at all, even without a signature.

FIG. 3 illustrates a second example 300 that involves assertions for payment information 370, privacy 372, and reputation for payments 374, according to examples of the present disclosure. When authorizing a payment, a relying party's (web application 325) application logic may call for one or more of these assertions: a payment information assertion 370; a privacy assertion 372; and a reputation assertion 374. The privacy assertion 372 and reputation 374 assertion could be similar to the ones in the previous example of FIG. 2. Payment information assertion 370 could relate the payee's account number or payment information to the payee's domain name, email address, or social media identifier.

Similar to the example of FIG. 2, the various issuers (payment authority 305, privacy authority 310, reputation authority 315) could create the assertions after interacting with and/or evaluating the payee (and its associated business). The issuers (payment authority 305, privacy authority 310, reputation authority 315) and/or the subject (payee 320) could then communicate with directory access service 330 to publish the assertions in directory 335. Directory access service 330 can be similar to directory access service(s) 120a, 120b, 120c, 230. Directory 335 can be similar to directory 235 of FIG. 2. Directory 335 is partitioned into sub-directories by issuer: payment information 345 managed by payment authority directory 340; privacy 355 managed by privacy authority directory 350; and reputation 365 managed by reputation authority directory 360. The subject (payee 320) and/or a directory authority (authority of directory 335) could again add its own signature to the assertion. There could be multiple payment authorities, e.g., or more for each payment network, just as there could be multiple privacy authorities and multiple reputation authorities.

The directory authority (authority for directory 335) might again be the only signer if the subject publishes just its payment information in directory 335, similar to publishing just a public key. The PMTA record, discussed above, currently takes this approach: the record includes the payment information, but not a separate issuer's signature. However, just as a public key is contained within a certificate signed by a certification authority, payment information could be contained within a payment information assertion signed by a payment information authority. The subject and/or the directory authority could also add its own signature, depending on the requirements of the relying parties.

An "extended" PMTA record can be defined for the purposes just mentioned by adapting fields of the TLSA record. The TLSA record has four fields: certificate usage, selector, matching type, and certificate association data. The certificate usage field can have four values, specifying the constraints the relying party should impose on a certificate validation chain:

PKIX-TA: the chain must be validated according to the Public Key Infrastructure for X.509 certificates (PKIX) standards and must include a trust anchor ("TA") certificate that matches the certificate association data (as further qualified by the second and third fields)

PKIX-EE: the chain must be validated according to PKIX, and the end-entity ("EE") certificate—i.e., the subject's certificate—must match the certificate association data DANE-TA: the same as PKIX-TA, except that the chain does not need to validate up to an externally specified trust anchor, as long as it includes a matching TA certificate DANE-EE: the end-entity certificate must match the certificate association data—PKIX is not required The selector field can have two values: Cert, indicating that the full certificate (or its hash) must match the certificate association data; and subject public key information ("SPKI"), indicating that the subject's public key portion (or its hash) must match. The matching type field indicates whether the certificate association data is the actual value being matched (full), or just its hash (SHA2-256 or SHA2-512).

None of these TLSA fields is directly relevant to the current PMTA record because the current PMTA record doesn't contain a certificate. However, suppose one were to replace the EE certificate in TLSA with a payment information assertion signed by an issuer, and suppose further that the issuer's public key were managed with a certificate (the same way that a CA's public key is). Then the fields of the TLSA record can be used to support the extended PMTA use cases as follows:

replace "EE certificate" with "payment information assertion"

limit PKIX validation, where required, to only the CA certificates in the certificate chain in the PKIX-EE and DANE-EE cases, replace "Cert" with "payment information assertion" and "SPKI" with "PI" (for "payment information"—thus the match would be against the "raw" payment information or its hash, analogous to the raw public key or hash in TLSA)

The current PMTA record effectively realizes just one of the possible combinations of field values, i.e. the equivalent of (DANE-EE, PI, full). The other combinations would support different trust models.

FIG. 4 illustrates a third example 400 that involves device supply chains, according to examples of the disclosure. In this example, a relying party (device user 425) may be interacting with device 420, or more generally the data produced and signed by device 420. For example, device 420 can be Internet of Things ("IoT") device, e.g., an intelligent device that includes at least a sensor and a transceiver. It may be important to the relying party (device user 425) that the "supply chain" around a device is validated. Here, the relying party's application logic might call for one or more of public key assertion 470, factory test assertion 472, and field test assertion 474.

The relying party (device user 425) may need the device's public key in order to verify the device's signature. It also may want to know how the device performed in its original factory test and in its most recent field test. For example, in a statistical analysis, the relying party may exclude or reduce the weight of measurements from devices with lower scores in the factory and field tests.

One or more of these assertions (public key assertion 470, factory test assertion 472, and field test assertion 474) could be published, using directory access service 430, in directory 435 in a similar way to the previous examples of FIGS. 2 and 3. Directory access service 430 can be similar to directory access service(s) 120a, 120b, 120c, 230. 330. Directory 435 can be similar to director 253, 353. Directory 435 is partitioned into sub-directories by issuer: public key information 445 managed by public key directory 440; factory test 455 managed by factory test authority directory 450; and field test 465 managed by field test authority directory 460. There would be a market for issuers specializing in just factory tests and field tests, apart from any public-key management. The various combinations of issuer, subject, and directory authority signatures would support different trust models specifying which assertions the relying party trusts for what purpose.

Figure 5:
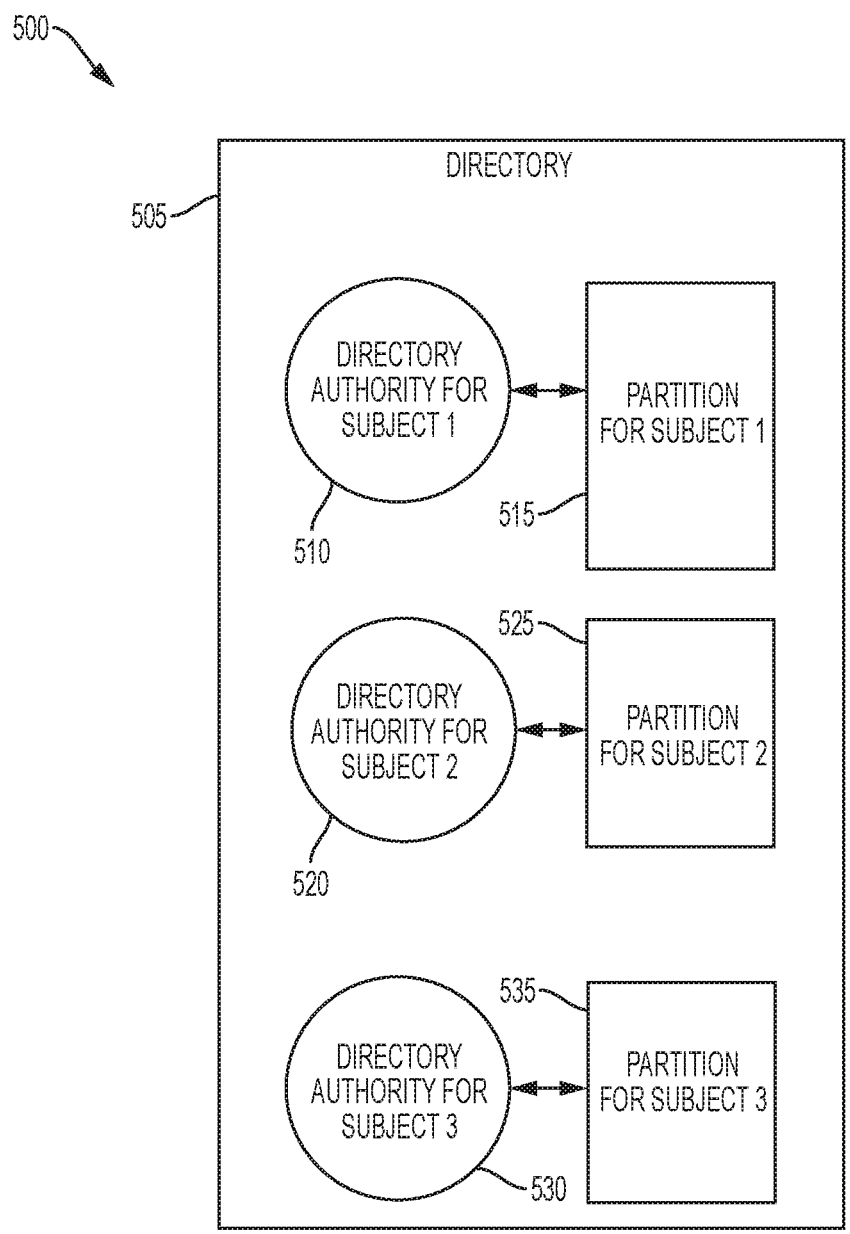
FIG. 5 shows an example directory system that is partitioned by three subjects, according to examples of the disclosure.

As discussed above, the directory can be partitioned by subject. FIG. 5 shows an example directory system 500 that is partitioned by three subjects, according to examples of the disclosure. As shown in FIG. 5, directory 505 is partitioned into partition 515 for subject 1 managed by directory authority 510 for subject 1, partition 525 for subject 2 managed by directory authority 520 for subject 2, and partition 535 for subject 3 managed by directory authority 530 for subject 3. Directory 505 can be partition into more or less than three parts, and each part can support one or more than one subjects.

In some example, the directory access service can be provided as a service hosted by a DNS provider, such as by a recursive name server in a DNS environment. The directory can reside within DNS and its entries secured using DNSSEC or DNSSEC/DANE. Similar to DNS provisioning through the Extensible Provisioning Protocol (EPP) or the Denominator protocol, the directory access service can be used to obtain and provision the assertions from issuers, i.e., publish and provide a record of the assertions. Similar to DNS resolution, relying parties can obtain the assertions through the directory access service. The resource owner (also referred to as subject(s)), such as an owner of a device or other information, can interact with issuers to obtain assertions, which can then be published through a provisioning or DNS management protocol into an authoritative name server, which can provide a multifaceted assertion directory access service.

Figure 6:
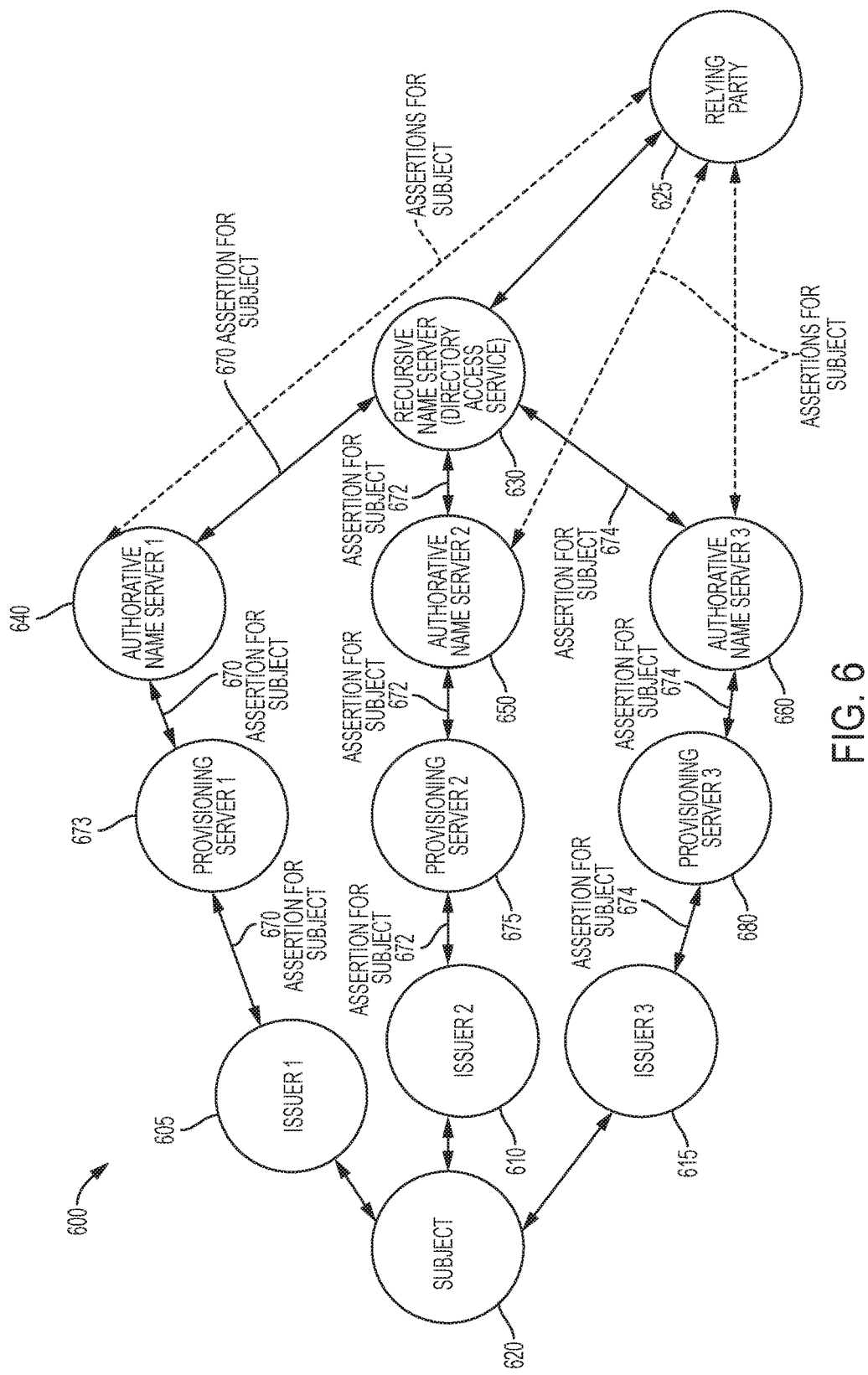
FIG. 6 shows an example environment for providing the directory access service using the DNS infrastructure, according to examples of the present disclosure.

FIG. 6 shows an example environment 600 for providing the directory access service using the DNS infrastructure, according to examples of the present disclosure. Issuer 1 605, Issuer 2 610, and Issuer 3 615 communicates with subject 620 to provide one or more respective assertions 670, 672, 674 for subject 620. Issuer 1 605 communicates with provisioning server 1 673, which communicates with authoritative name server 640, Issuer 2 610 communicates with provisioning server 2 675, which communicates with authoritative name server 650, Issuer 3 615 communicates with provisioning server 3 680, which communicates with authoritative name server 660 to provide and provision the respective assertions 670, 672, 674 for subject 620, for example using a provisioning protocol. In some examples, provisioning server 1 673, provisioning server 2 675, and provisioning server 3 680 can be the same server. The authoritative name servers 640, 650, 660 can each have a respective directory for storing the assertions, for example, in one or more DNS records, and can be secured using DNSSEC and/or DANE. Authoritative name servers 640, 650, 660 communicate with recursive name server 630, which provide a directory access service, to provide the assertions for subject 620. Relying party 625 can then access the assertions from the directory access service provided by the recursive name server 630 using DNS queries. In some examples, relying party 625 can communicate directly with authoritative name server 1 640, authoritative name server 2 650, and/or authoritative name server 3 660 to obtain assertions. In some examples, issuer 1 605, issuer 2 610, and/or issuer 3 615 can communicate directly with authoritative name server 1 640, authoritative name server 2 650, and/or authoritative name server 3 660 to provide and provision the respective assertions.

In some examples, the directory access service can provide two services through different protocols, such as EPP, Denominator, DNS and the Registration Data Access Protocol (RDAP), where one service is used for publication of assertions and the other service is used for consumption of assertions. Alternatively, the directory access service can combine both services into a single service that can do both using one or more protocols and can be configured to give general access to some users to get any assertions they want, more restricted access to some other users, and then further restricted access for some users to update information. For example, in the most restrictive case, only the subject may be allowed to update information about the subject.

Figure 7:
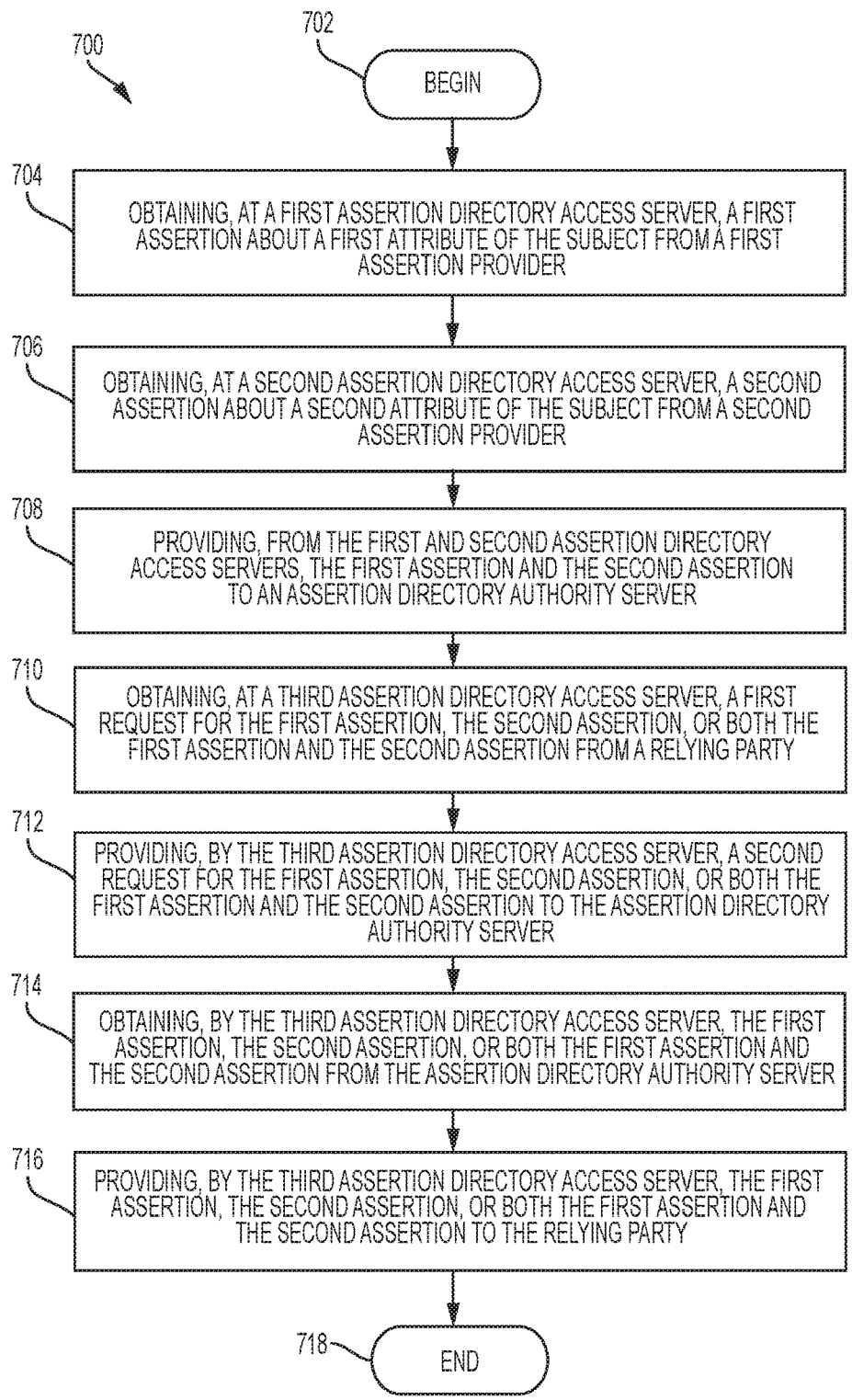
FIG. 7 shows an example method for the multifaceted assertion directory system, according to examples of the disclosure.

FIG. 7 shows an example method for providing one or more assertions for a subject 700. The method can begin at 702. At 704, a first assertion directory access service provided by a first assertion directory access server, such as assertion directory access service 120a, 120b, 120c, 230, 330, and 430, and provisioning servers 670, 675, and 680, obtains, over a network, a first assertion about a first attribute of the subject from a first assertion provider. At 706, a second assertion directory access service provided by a second assertion directory access server obtains, over a network, a second assertion about a second attribute of the subject from a second assertion provider. In some examples, the first assertion provider and/or the second assertion provider can be an issuer of the respective first and/or second assertion that makes one or more statements contained in the respective first and/or second assertion and confirms the one or more statements with a digital signature. In some examples, the first assertion provider and/or the second assertion provider is the subject. In some examples, the first and/or second assertions can comprise a web server certificate, a public key assertion, a privacy assertion, a reputation assertion, a payment information assertion, a factory test assertion, or a field test assertion. For example, the subject can be, but not limited to, the web server 220 as described with FIG. 2, the payee 320 as described with FIG. 3, or the IoT device 420 as described with FIG. 4. Other subject types for which assertions can be made may be used in the methods and systems of the present disclosure. For example, the assertion issuer(s) can include, but are not limited to, issuers 125a, 125b, 125c of FIG. 1, the certification authority 205, privacy authority 210, reputation authority 215 of FIG. 2, the payment authority 305, the privacy authority 310, the reputation authority 315 of FIG. 3, the public key authority 405, factory test authority 410, field test authority 415 of FIG. 4, or issuer 1 605, issuer 2 610, issuer 3 615 of FIG. 6. Other issuers that provide assertions for subjects can also be used. In some examples, the first assertion directory access service and the second directory access service can be managed by the same server or different servers.

At 708, the first assertion directory access server that provides the first assertion directory access service and the second assertion directory access server that provides the second assertion directory access service provide the respective first assertion and second assertion to an assertion directory authority server, such as the assertion directory authority 110a, 110b, 110c, over a network. Each directory authority server can communicate with a respective partition, such as partition 1 115a, partition 2 115b, and partition 3 115c, of the directory, such as directory 105. The directory can be structured as a database and the database can be partitioned such that a respective directory authority server can communicate with a respective partition, as discussed above. The first assertion directory access server and/or the second assertion directory access server can create digital signature(s) for one or more of the respective assertions using a digital signature protocol and a cryptographic key associated with the respective assertion directory access server.

At 710, a third assertion directory access server obtains, via a network, a first request for the first assertion, the second assertion, or both the first assertion and the second assertion from a relying party, such as the relying party 135a, 135b, 135c, 225 (the web application), 325 (the web application), 425 (the device user), 625. In some examples, the third assertion directory access server can be the same as the first assertion directory access server. In this way, the same server can provide the functionality associated with the first assertion directory access service, such as provisioning, e.g., publishing, assertions, as well as provide the functionality of the third assertion directory access service, such as subscribing, e.g., obtaining assertions. In some examples, the third assertion directory access server can be server(s) providing the functionality of assertion directory access service 120a, 120b, 120c, 230, 330, and 430, and the recursive name server 630. At 712, the first assertion directory access server provides, via a network, a second request for the first assertion, the second assertion, or both the first assertion and the second assertion that was requested to the assertion directory authority server. At 714, the third assertion directory access server obtains, via a network, the first assertion, the second assertion, or both the first assertion and the second assertion that was requested from the assertion directory authority server. At 716, the third assertion directory access service provides, via a network, the first assertion, the second assertion, or both the first assertion and the second assertion that was requested to the relying party. The first assertion directory access service can also determine that the relying party is permitted to access the first assertion, the second assertion, or both the first assertion and the second assertion based on a policy. At 718, the method can end.

Figure 8:
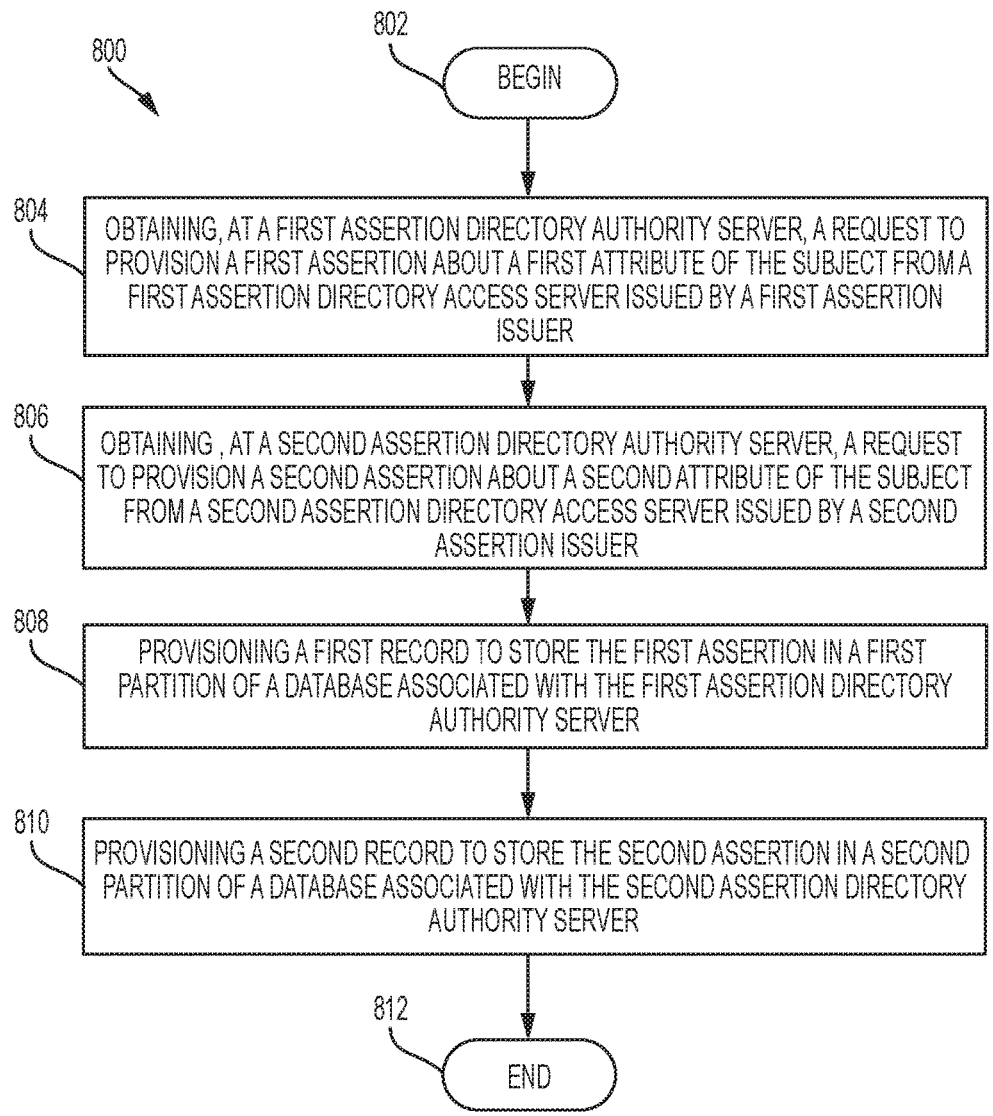
FIG. 8 shows an example method for the multifaceted assertion directory system, according to examples of the disclosure.

FIG. 8 shows an example method for provisioning one or more assertions about a subject 800, according to examples of the present disclosure. The method can begin at 802. At 804, a first assertion directory authority server, such as the assertion directory authority server 110a, obtains, via a network, a request to provision a first assertion about a first attribute of the subject from a first assertion directory access service provided by a first assertion directory access server, such as directory access service 120a, issued by a first assertion issuer, such as issuer 125a or subject 130a. For example, the subject can be, but not limited to, the subject 130a, web server 220 as described with FIG. 2, the payee 320 as described with FIG. 3, or the IoT device 420 as described with FIG. 4. Other subject types for which assertions can be made may be used in the methods and systems of the present disclosure. At 806, a second assertion directory authority server, such as the assertion directory authority server 110b, obtains, via a network, a request to provision a second assertion about a second attribute of the subject from a second assertion directory access service provided by a second assertion directory access server, such as directory access server 120b, issued by a second assertion issuer, such as issuer 125b or subject 130a. For example, the subject can be, but not limited to, the subject 130b, web server 220 as described with FIG. 2, the payee 320 as described with FIG. 3, or the IoT device 420 as described with FIG. 4. Other subject types for which assertions can be made may be used in the methods and systems of the present disclosure. For example, the assertion issuer(s) can include, but are not limited to, issuers 125a, 125b, 125c of FIG. 1, subjects 130a, 130*b*, 130*c* of FIG. 1, the certification authority 205, privacy authority 210, reputation authority 215 of FIG. 2, the payment authority 305, the privacy authority 310, the reputation authority 315 of FIG. 3, the public key authority 405, factory test authority 410, field test authority 415 of FIG. 4, or issuer 1 605, issuer 2 610, issuer 3 615 of FIG. 6. Other assertion issuers that provide assertions for subjects can also be used. At 808, a hardware processor of the first assertion directory authority server, i.e., directory authority 110*a*, provisions a first record to store the first assertion in a first partition, i.e., partition 1 115*a*, of a database of a directory, i.e., directory 105, associated with the first assertion directory authority server. At 810, a hardware processor of the second assertion directory authority server, i.e., directory authority 110*b*, provisions a second record to store the second assertion in a second partition, i.e., partition 2 115*b*, of a database of a directory, i.e., directory 105, associated with the second assertion directory authority server. At 812, the method can end.

In some examples, each assertion directory authority server manages access and associated directed entries for a respective partition. The access can comprise one or more of: a publication, an update, a deletion, and a lookup. The access can be based on one or more policies from one or more of: the first assertion directory authority server, the second assertion directory authority server, the first assertion issuer, the second assertion issuer, the subject, a relying party. In some examples, each assertion directory authority server can be operable to determine usage statistics for the partition under control of each assertion directory authority server. In some examples, the record(s) can comprise information for the assertion issuer, the subject, an attribute type, and an attribute value arranged as a tuple. In some examples, the record(s) can further comprise a serial number and a validity period. In some examples, the record(s) can be stored as a digital certificate, an attribute certificate, a domain name system security extension ("DNSSEC") record, a domain name system-based authentication of named entities ("DANE") record, or a security assertion markup language ("SAML") assertion. In some examples, the records can be digitally signed by one or more entities, wherein the one or more entities comprise a respective assertion issuer, the subject, a respective assertion directory authority server. In some examples, the assertions can comprise a web server certificate, a public key assertion, a privacy assertion, a reputation assertion, a payment information assertion, a factory test assertion, or a field test assertion. In some examples, the first assertion directory authority server and the second assertion directory authority server are the same. In some examples, the first assertion directory access server and the second assertion directory access server are the same.

In some examples, a method of providing one or more assertions about a subject is provided, according to examples of the present disclosure. The method includes obtaining, at an assertion directory access server and over a network, a first assertion about a first attribute of the subject from a first assertion issuer. The method also includes obtaining, at the assertion directory access server and over a network, a second assertion about a second attribute of the subject from a second assertion issuer. The method further includes providing, from the assertion directory access server, the first assertion and the second assertion to an assertion directory authority server over a network.

Figure 9:
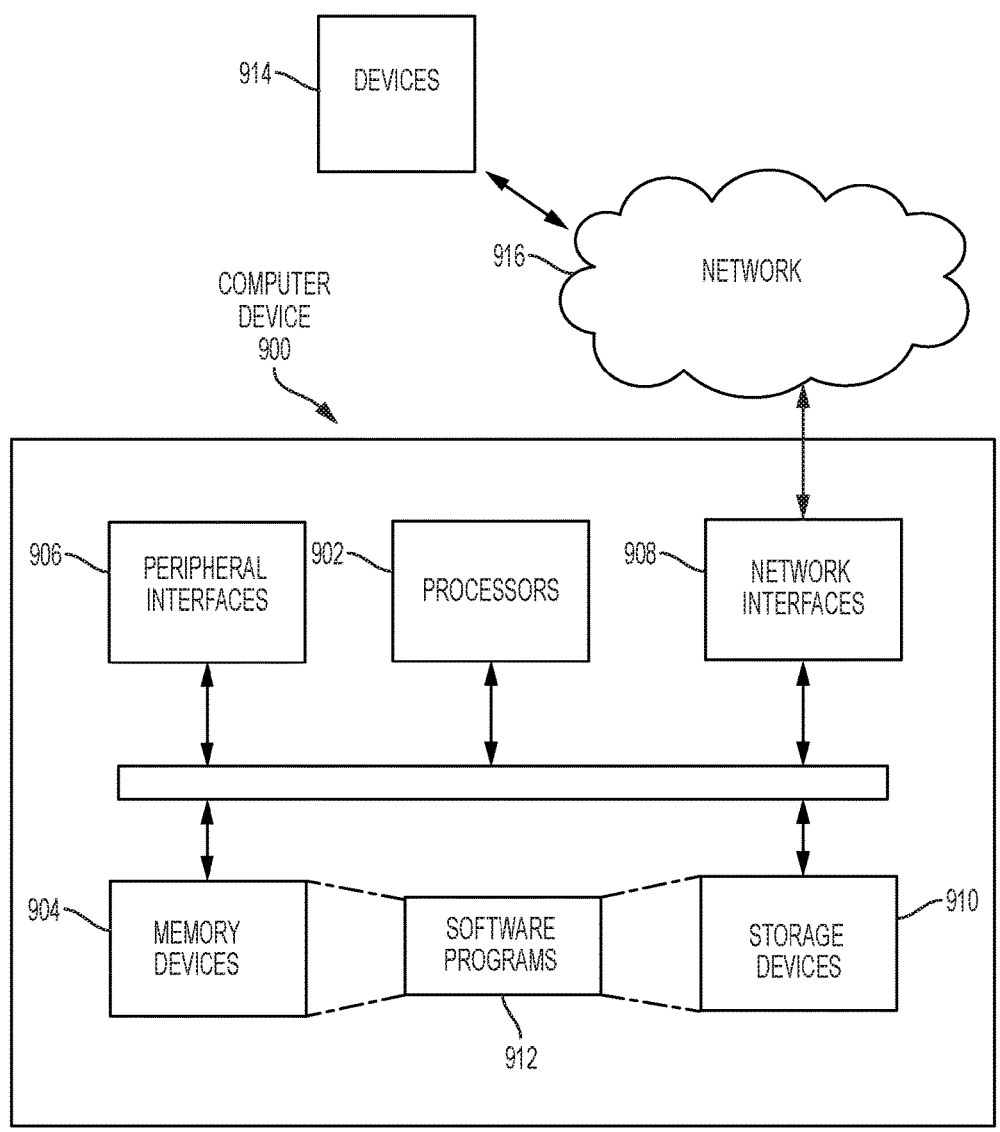
FIG. 9 shows an example computer system according to examples of the present disclosure.

FIG. 9 illustrates an example of a hardware configuration for computer device 900, that can be used to perform one or more of the processes described above. While FIG. 9 illustrates various components contained in computer device 900, FIG. 9 illustrates one example of a computer device and additional components can be added and existing components can be removed.

Computer device 900 can be any type of computer devices, such as desktops, laptops, servers, etc., or mobile devices, such as smart telephones, tablet computers, cellular telephones, personal digital assistants, DNS servers, IoT devices, directory access services, assertion directory, issuer (s), relying parties, subjects, etc. As illustrated in FIG. 9, computer device 900 can include one or more processors 902 of varying core configurations and clock frequencies. Computer device 900 can also include one or more memory devices 904 that serve as a main memory during the operation of computer device 900. For example, during operation, a copy of the software that supports the processes described herein can be stored in the one or more memory devices 904. Computer device 900 can also include one or more peripheral interfaces 906, such as keyboards, mice, touchpads, computer screens, touchscreens, etc., for enabling human interaction with and manipulation of computer device 900.

Computer device 900 can also include one or more network interfaces 908 for communicating via one or more networks, such as Ethernet adapters, wireless transceivers, or serial network components, for communicating over wired or wireless media using protocols. Computer device 900 can also include one or more storage device 910 of varying physical dimensions and storage capacities, such as flash drives, hard drives, random access memory, etc., for storing data, such as images, files, and program instructions for execution by the one or more processors 902.

Additionally, computer device 900 can include one or more software programs 912 that enable the functionality of the processes described above. The one or more software programs 912 can include instructions that cause the one or more processors 902 to perform the processes described herein. Copies of the one or more software programs 912 can be stored in the one or more memory devices 904 and/or on in the one or more storage devices 910. Likewise, the data utilized by one or more software programs 912 can be stored in the one or more memory devices 904 and/or on in the one or more storage devices 910.

In implementations, computer device 900 can communicate with one or more other devices 914 via a network 916. The one or more other devices 914 can be any types of devices as described above. Network 916 can be any type of network, such as a local area network, a wide-area network, a virtual private network, the Internet, an intranet, an extranet, a public switched telephone network, an infrared network, a wireless network, and any combination thereof. Network 916 can support communications using any of a variety of commercially-available protocols, such as TCP/IP, UDP, OSI, FTP, UPnP, NFS, CIFS, AppleTalk, and the like. Network 916 can be, for example, a local area network, a wide-area network, a virtual private network, the Internet, an intranet, an extranet, a public switched telephone network, an infrared network, a wireless network, and any combination thereof.

Computer device 900 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of computer device 900 as described above need not be enclosed within a single enclosure or even located in close proximity to one another. Those skilled in the art will appreciate that the above-described componentry are examples only, as computer device 900 can include any type of hardware componentry, including any necessary accompanying firmware or software, for performing the disclosed implementations. Computer device 900 can also be implemented in part or in whole by electronic circuit components or processors, such as application-specific integrated circuits (ASICs) or field-programmable gate arrays (FPGAs).

The method of FIGS. 7 and 8 may be implemented at least in part by computer system 900. For example, the functionality of assertion directory access service, the assertion directory, the relying party, the issuer(s), and/or subject(s) may be implemented as software programs 912 stored in memory devices 904 and/or storage devices 910 of computer system 900.

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described herein can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of providing one or more assertions about a subject, comprising:

obtaining, at a first assertion directory access server and over a network, a first assertion about a first attribute of the subject from a first assertion provider;

obtaining, at a second assertion directory access server and over the network, a second assertion about a second attribute of the subject from a second assertion provider;

providing, from the first assertion directory access server and the second assertion directory access server, the first assertion and the second assertion, respectively, to an assertion directory authority server over the network;

obtaining, at a third assertion directory access server and over the network, a first request for the first assertion, the second assertion, or both the first assertion and the second assertion from a relying party;

providing, by the third assertion directory access server and over the network, a second request for the first assertion, the second assertion, or both the first assertion and the second assertion to the assertion directory authority server;

obtaining, by the third assertion directory access server and over the network, the first assertion, the second assertion, or both the first assertion and the second assertion from the assertion directory authority server based on one or more access control policies that are associated with the first assertion or the second assertion and are maintained by the assertion directory authority server; and providing, by the third assertion directory access server and over the network, the first assertion, the second assertion, or both the first assertion and the second assertion to the relying party.

2. The method of claim 1, wherein the first assertion or the second assertion comprises a web server certificate, a public key assertion, a privacy assertion, a reputation assertion, a payment information assertion, a factory test assertion, or a field test assertion.

3. The method of claim 1, further comprising creating a digital signature for the first assertion, the second assertion, or both the first assertion and the second assertion using a digital signature protocol and a cryptographic key associated with the first assertion directory access server or the second directory access server.

4. The method of claim 1, further comprising determining that the relying party is permitted to access the first assertion, the second assertion, or both the first assertion and the second assertion based on a policy.

5. The method of claim 1, wherein the first assertion provider is a first issuer of the first assertion that makes one or more statements contained in the first assertion and confirms the one or more statements with a digital signature.

6. The method of claim 1, wherein the second assertion provider is a second issuer of the second assertion that makes one or more statements contained in the second assertion and confirms the one or more statements with a digital signature.

7. The method of claim 1, wherein the first assertion provider is the subject.

8. The method of claim 1, wherein the second assertion provider is the subject.

9. The method of claim 1, wherein the first assertion directory access server and the second assertion directory access server are the same.

10. The method of claim 1, wherein the first assertion directory access server and the third assertion directory access server are the same.

11. A method of provisioning one or more assertions about a subject, comprising:

obtaining, at a first assertion directory authority server over a network, a request to provision a first assertion about a first attribute of the subject from a first assertion directory access service server and issued by a first assertion issuer;

obtaining, at the first assertion directory authority server over the network, a request to provision a second assertion about a second attribute of the subject from a second assertion directory access service server and issued by a second assertion issuer;

based on one or more access control policies associated with the first assertion and maintained by the first assertion directory authority server, provisioning, by a hardware processor of the first assertion directory authority server, a first record to store the first assertion in a first partition of a database associated with the first assertion directory authority server; and based on one or more access control policies that are associated with the second assertion and are maintained by the first assertion directory authority server, provisioning, by a hardware processor of the first assertion directory authority server, a second record to store the second assertion in a second partition of a database associated with the first assertion directory authority server.

12. The method of claim 11, wherein each assertion directory authority server manages access and associated directory entries for a respective partition.

13. The method of claim 12, wherein the access comprises one or more of: a publication, an update, a deletion, and a lookup.

14. The method of claim 13, wherein the access is based on one or more policies from one or more of: the first assertion directory authority server, the second assertion directory authority server, the first assertion provider, the second assertion provider, the subject, and a relying party.

15. The method of claim 11, wherein each assertion directory authority server is operable to determine usage statistics for the partition under control of each assertion directory authority server.

16. The method claim 11, wherein the first record comprises information for the first assertion issuer, the subject, an attribute type, and an attribute value arranged as a tuple.

17. The method of claim 16, wherein the first record further comprises a serial number and a validity period.

18. The method of claim 11, wherein the first record and the second record are stored as a digital certificate, an attribute certificate, a domain name system security extension ("DNSSEC") record, a domain name system-based authentication of named entities ("DANE") record, or a security assertion markup language ("SAML") assertion.

19. The method of claim 11, wherein the first record and the second record are digitally signed by one or more entities, wherein the one or more entities comprise a respective assertion issuer, the subject, or a respective directory authority.

20. The method of claim 11, wherein the first assertion or the second assertion comprises a web server certificate, a public key assertion, a privacy assertion, a reputation assertion, a payment information assertion, a factory test assertion, or a field test assertion.

21. The method of claim 11, wherein the first assertion directory authority server and the second access directory authority server are the same.

22. The method of claim 11, wherein the first assertion directory access service server and the second assertion directory access service server are the same.

23. A method of providing one or more assertions about a subject, comprising:

obtaining, at an assertion directory access server and over a network, a first assertion about a first attribute of the subject from a first assertion provider;

obtaining, at the assertion directory access server and over the network, a second assertion about a second attribute of the subject from a second assertion provider; and providing, from the assertion directory access server, the first assertion and the second assertion to an assertion directory authority server over the network for storage based on one or more access control policies that are associated with the first assertion and the second assertion and are maintained by the assertion directory authority server.

\* \* \* \* \*